(12) United States Patent
Masuko et al.

(10) Patent No.: US 7,436,239 B2
(45) Date of Patent: Oct. 14, 2008

(54) ELECTRONIC DEVICE INCLUDING CHARGE PUMP CIRCUIT

(75) Inventors: Hiroyuki Masuko, Chiba (JP); Fumiyasu Utsunomiya, Chiba (JP)

(73) Assignee: Seiko Instruments Inc., Chiba (JP)

( * ) Notice: Subject to any disclaimer, the term of this patent is extended or adjusted under 35 U.S.C. 154(b) by 213 days.

(21) Appl. No.: 11/412,379

(22) Filed: Apr. 26, 2006

(65) Prior Publication Data

US 2006/0255853 A1  Nov. 16, 2006

(30) Foreign Application Priority Data

Apr. 28, 2005  (JP) ............... 2005-131003

(51) Int. Cl.
*G05F 1/10* (2006.01)
(52) U.S. Cl. ......................... 327/536; 363/60
(58) Field of Classification Search .................. 327/536; 363/59–60
See application file for complete search history.

(56) References Cited

U.S. PATENT DOCUMENTS

| | | | | |
|---|---|---|---|---|
| 5,059,815 A | * | 10/1991 | Bill et al. | 327/536 |
| 5,066,870 A | * | 11/1991 | Kobatake | 327/536 |
| 5,412,257 A | * | 5/1995 | Cordoba et al. | 327/536 |
| 5,422,590 A | * | 6/1995 | Coffman et al. | 327/537 |
| 5,886,566 A | * | 3/1999 | Park et al. | 327/536 |
| 6,480,057 B2 | * | 11/2002 | Ogura | 327/536 |
| 7,030,683 B2 | * | 4/2006 | Pan et al. | 327/536 |
| 7,236,425 B2 | * | 6/2007 | Sudou | 365/233.14 |
| 2002/0130704 A1 | | 9/2002 | Myono et al. | |

FOREIGN PATENT DOCUMENTS

JP  2002-233134  8/2002

* cited by examiner

*Primary Examiner*—N. Drew Richards
*Assistant Examiner*—Thomas J Hiltunen
(74) *Attorney, Agent, or Firm*—Brinks Hofer Gilson & Lione

(57) ABSTRACT

Provided is an electronic device including a charge pump circuit whose circuit structure is simple and boosting efficiency is high. The charge pump circuit uses MOSFETs as charge transfer elements and has a structure in which a voltage of a gate of a charge transfer MOSFET is controlled to a predetermined level based on a dividing voltage caused by a first resistor connected between a source and the gate thereof and a second resistor connected between a drain and the gate thereof and a clock pulse for on/off control of the charge transfer MOSFET is supplied to the gate through a capacitor.

4 Claims, 2 Drawing Sheets

US 7,436,239 B2

ELECTRONIC DEVICE INCLUDING CHARGE PUMP CIRCUIT

This application claims priority under 35 U.S.C. §119 to Japanese Patent Application No 2005-131003 filed Apr. 28, 2005, the entire content of which is hereby incorporated by reference.

BACKGROUND OF THE INVENTION

1. Field of the Invention

The present invention relates to a charge pump circuit employed for an electronic device and the like.

2. Description of the Related Art

An existing electronic device includes a plurality of ICs in order to realize a function thereof. The ICs are driven at different voltages, so that a plurality of voltages different from a power source voltage are required. Up to now, the plurality of voltages are generated by a switching regulator or a charge pump circuit.

The switching regulator has high power efficiency. However, there is a disadvantage in that a harmonic noise is caused at the time of current switching, so that it is necessary to use a shielded power source circuit. In addition, a coil is required as an external part, with the result that the switching regulator is not suitable for a small electronic device.

On the other hand, the charge pump circuit can generate a high voltage with a low noise. However, there is a disadvantage in that power efficiency is low, so that the charge pump circuit is not suitable as a power source circuit for a mobile device in which the power efficiency is set at the highest priority. Therefore, if a charge pump circuit having high power efficiency can be realized, the charge pump circuit becomes a power source most suitable for a small mobile device.

In a fundamental charge pump circuit, diodes are used as charge transfer elements and a charge is successively transferred to a next stage to increase a voltage. In contrast to this, in a charge pump circuit mounted on a MOS integrated circuit, MOSFETs instead of the diodes are used as the charge transfer elements because of adaptability to a process. However, in the charge pump circuit using the MOSFETs as the charge transfer elements, a threshold voltage Vth of each of the MOSFETs is increased by the effect of a substrate used for the charge pump circuit, with the result that the power efficiency reduces as the number of stages increases. Therefore, there has been proposed a charge pump circuit in which a voltage loss caused by the threshold voltage Vth of each of charge transfer MOSFETs is reduced to improve the power efficiency (for example, see JP 2002-233134 A).

FIG. 4 is a circuit diagram showing a conventional charge pump circuit using charge transfer MOSFETs.

The conventional charge pump circuit using charge transfer MOSFETs includes N-type MOSFETs 700 to 703 in each of which a source thereof is connected with a substrate thereof, coupling capacitors 710 to 712 each of which is connected with a drain of corresponding one of the N-type MOSFETs 700 to 703, a clock generating circuit 730, and reverse level shifting circuits 720 to 723 for converting clock signals outputted from the clock generating circuit 730 into voltages and transferring the voltages to corresponding gates of the N-type MOSFETs 700 to 703. A connection point between the N-type MOSFETs 702 and 703 is connected with a Dickson charge pump circuit including two N-type MOSFETs 704 and 705 and two coupling capacitors 713 and 714 (hereinafter referred to as a "branch charge pump circuit 733"). A power source terminal, which is located on a low-potential side, of each of the reverse level shifting circuits 720 to 723 is connected with the source of one of the N-type MOSFETs 700 to 703 which is provided in a corresponding stage. A power source terminal, which is located on a high-potential side, of each of the reverse level shifting circuits 720 and 721 is connected with the source of one of the N-type MOSFETs 702 and 703 which is provided in a second next stage.

The reverse level shifting circuit 720 outputs a voltage V2 to the gate of the N-type MOSFET 700 when a clock pulse CLK' is an L-level, so that the N-type MOSFET 700 becomes an on state. When the clock pulse CLK' is an H-level, the reverse level shifting circuit 720 outputs a voltage Vdd to the gate of the N-type MOSFET 700, so that the N-type MOSFET 700 becomes an off state. Similarly, each of the reverse level shifting circuits shifts levels of the clock pulse CLK' and a clock pulse CLKB' and supplies a corresponding voltage to the gate of each of the N-type MOSFETs.

Next, a boosting operation of the charge pump circuit which is in a steady state will be described. When each of the N-type MOSFETs 700 and 702 is in an on state (CLK'=L-level), V1=Vdd, V2=3 Vdd, and V3=3 Vdd. In the branch charge pump circuit 733, (V4=5 Vdd−Vth) and (V5=5 Vdd−2 Vth). Here, Vth denotes a threshold voltage of each of the N-type MOSFETs 704 and 705.

On the other hand, when each of the N-type MOSFETs 701 and 703 is turned on (CLKB'=L), V1=2 Vdd, V2=2 Vdd, and V3=4 Vdd. In the branch charge pump circuit 733, (V4=4 Vdd−Vth) and (V5=6 Vdd−2 Vth).

As described above, an absolute value of Vgs at the time when each of the N-type MOSFETs is turned on becomes substantially the same value (2 Vdd) and the absolute value of Vgs at the time when each of the N-type MOSFETs is turned off becomes 0 V. Therefore, Vgs is a high voltage, so that an on-resistance of each of the N-type MOSFETS reduces. Thus, a high-efficiency charge pump circuit having a large output current capacity can be realized.

However, the level shifting circuit is used for the conventional charge pump circuit using the charge transfer MOSFETs, so that the current consumption of the charge pump circuit is increased by the current consumption of the level shifting circuit and a through current flows at the time when an output of the level shifting circuit is reversed. Therefore, the level shifting circuit hinders the improvement of boosting efficiency.

A level shifting circuit generates a voltage to be applied to the gate of a charge transfer MOSFET based on a potential caused in a second next stage. Therefore, there is a problem in that it takes a long time to obtain a stable state after a power source voltage is applied.

SUMMARY OF THE INVENTION

The present invention has been made to solve the above-mentioned problems. According to the present invention, it is possible to provide a charge pump circuit which is a simple circuit and has high boosting efficiency and a short start time.

The charge pump circuit according to the present invention employs a structure including the following means, in which a voltage is supplied to a gate of a charge transfer MOSFET. That is, the charge pump circuit employs a structure including:

a plurality of charge transfer MOSFETs connected in series;

first coupling capacitors in which first ends thereof are connected with respective connection points of the charge transfer MOSFETs and in which first clock pulses whose phases are reversed to each other are supplied to second ends of the first coupling capacitors;

second coupling capacitors in which first ends thereof are connected with gates of the charge transfer MOSFETs and in which second clock pulses whose phases are reversed to each other and which have potentials different from those of the first clock pulses are supplied to second ends of the second coupling capacitors;

first resistors whose first ends are connected with source of the charge transfer MOSFETs and whose second ends are connected with the gates of the charge transfer MOSFETs; and second resistors whose first ends are connected with drains of the charge transfer MOSFETs and whose second ends are connected with the gates of the charge transfer MOSFETs.

According to the charge pump circuit in the present invention, a high voltage can be applied as a gate-source voltage Vgs of a charge transfer MOSFET by a simple circuit. Therefore, it is possible to provide a charge pump circuit having high boosting efficiency.

A voltage to be supplied to the gate of a charge transfer MOSFET is based on voltages caused in a previous stage and a next stage. Thus, a time necessary to obtain a stable state after a power source voltage is applied can be shortened.

DETAILED DESCRIPTION OF THE PREFERRED EMBODIMENTS

First Embodiment

Figure 2:
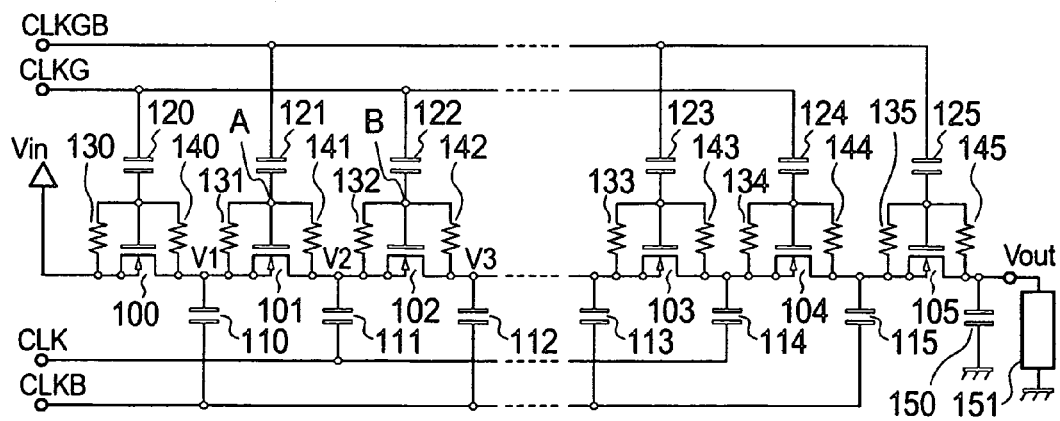
FIG. 2 is a circuit diagram showing a charge pump circuit according to a first embodiment of the present invention.

FIG. 2 is a circuit diagram showing a charge pump circuit according to a first embodiment of the present invention.

In FIG. 2, n N-type MOSFETs for charge transfer 100 to 105 in each of which a source thereof is connected with a substrate thereof are connected in series. Nodes at which respective adjacent N-type MOSFETs for charge transfer are connected with each other are connected with first ends of first coupling capacitors 110 to 115. A gate of each of the N-type MOSFETs for charge transfer 100 to 105 is connected with a source thereof through corresponding one of first resistors 130 to 135 and connected with a drain thereof through corresponding one of second resistors 140 to 145. In addition, the gates of the N-type MOSFETs are connected with first ends of second coupling capacitors 120 to 125. It is assumed that a resistance value of each of the first resistors is equal to that of each of the second resistors. A power source voltage Vdd is supplied as an input voltage Vin to the source of the N-type MOSFET for charge transfer 100 which is located in a first stage. A boosting voltage Vout is outputted from the drain of the N-type MOSFET for charge transfer 105 which is located in a final stage. The drain of the N-type MOSFET for charge transfer 105 is connected with an output capacitor 150 and a load 151.

First clock pulses CLK and CLKB whose phases are reversed to each other are alternately inputted to second ends of the first coupling capacitors 110 to 115. Second clock pulses CLKG and CLKGB whose phases are reversed to each other are alternately inputted to second ends of the second coupling capacitors 120 to 125. A peak value of each of the first clock pulses CLK and CLKB is Vdd. The second clock pulses CLKG and CLKGB are generated based on the first clock pulses CLK and CLKB. In order to prevent the reverse flow of currents flowing into the N-type MOSFETs for charge transfer 100 to 105, a period for a Lo level is shortened and the peak value is set to a suitable voltage (for example, 2 Vdd) equal to or larger than Vdd for turning on/off the N-type MOSFETs for charge transfer 100 to 105.

A combination of the N-type MOSFET for charge transfer 100, the first coupling capacitor 110, the second coupling capacitor 120, the first resistor 130, and the second resistor 140 is set as a first-stage boosting unit. A voltage at a connection point between the N-type MOSFET for charge transfer 100 and the first coupling capacitor 110 is expressed by Vl. The number of boosting unit in a boosting circuit is set to the number of stages of the boosting circuit. A combination of the N-type MOSFET for charge transfer 105, the first coupling capacitor 115, the second coupling capacitor 125, the first resistor 135, and the second resistor 145 is set as an n-th-stage boosting unit.

On/off control of the N-type MOSFETs for charge transfer 100 to 105 will be described with reference to FIG. 3. It is assumed that a peak value of each of the second clock pulses CLKG and CLKGB is 2 Vdd.

Figure 3:
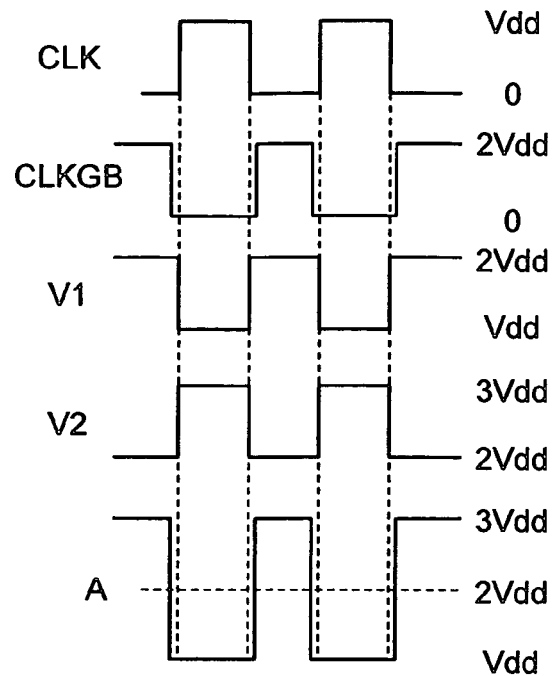
FIG. 3 is an explanatory timing chart showing an operation of the charge pump circuit according to the first embodiment of the present invention.

As shown in FIG. 3, when the first clock pulse CLK is an H-level in a second-stage boosting unit which is in a steady state, the voltage V1 of the source of the N-type MOSFET for charge transfer 101 is equal to Vdd. The voltage V2 of the drain of the N-type MOSFET for charge transfer 101 becomes 3 Vdd by the pumping operation of the first clock pulse CLK. As shown in FIG. 3, when the first clock pulse CLK is an L-level, the voltage V1 of the source of the N-type MOSFET for charge transfer 101 becomes 2 Vdd by the pumping operation of the first clock pulse CLK. The voltage V2 of the drain of the N-type MOSFET for charge transfer 101 becomes 2 Vdd. As shown by a broken line of FIG. 3, when the second coupling capacitor 121 is omitted, a voltage Vga of the gate (node A) of the N-type MOSFET for charge transfer 101 is a constant voltage, 2 Vdd, which is obtained by the voltages V1 and V2 by the first resistor and the second resistor. According to the pumping operation of the second clock pulse CLKGB supplied to a second end of the second coupling capacitor 121, the voltage Vga changes with respect to 2 Vdd described above. That is, when the second clock pulse CLKGB is an L-level (first clock pulse CLK is an H-level), the voltage Vga becomes Vdd. On the other hand, when the second clock pulse CLKGB is an H-level (first clock pulse CLK is an L-level), the voltage Vga becomes 3 Vdd.

In other words, when the first clock pulse CLK is the L-level, V1=2 Vdd and Vga=3 Vdd. Then, a gate-source voltage Vgs2 of the N-type MOSFET for charge transfer 101 which is located in a second stage is obtained as follows.

$$Vgs2 = Vga - V1 = 3\ Vdd - 2\ Vdd = Vdd$$

Therefore, the N-type MOSFET for charge transfer 101 which is located in the second stage becomes an on state. On the other hand, when the first clock pulse CLK is an H-level, V1=Vdd and Vga=Vdd. Then, the gate-source voltage Vgs2 of the N-type MOSFET for charge transfer 101 which is located in the second stage is obtained as follows.

$$Vgs2 = Vga - V1 = Vdd - Vdd = 0\,V$$

Therefore, the N-type MOSFET for charge transfer 101 which is located in the second stage becomes an off state.

The N-type MOSFET for charge transfer 102 which is a third-stage boosting unit operates in the same manner as described above. When the first clock pulse CLK is the L-level, V2=2 Vdd. At this time, according to the pumping operation of the first clock pulse CLKB, V3=4 Vdd. On the other hand, when the first clock pulse CLK is the H-level, V2=3 Vdd and V3=3 Vdd. According to the pumping operation of the second clock pulse CLKG, a voltage Vgb of a node B changes with respect to 3 Vdd. That is, when the second clock pulse CLKG is an H-level, the voltage Vgb becomes 2 Vdd. When the second clock pulse CLKG is an L-level, the voltage Vgb becomes 4 Vdd.

In other words, when the first clock pulse CLK is the L-level, a gate-source voltage Vgs3 of the N-type MOSFET for charge transfer 102 which is located in a third stage is obtained as follows.

$$Vgs3 = Vgb - V2 = 2\,Vdd - 2\,Vdd = 0\,V$$

Therefore, the N-type MOSFET for charge transfer 102 which is located in the third stage becomes an off state. On the other hand, when the first clock pulse CLK is an H-level, the gate-source voltage Vgs3 of the N-type MOSFET for charge transfer 102 which is located in the third stage is obtained as follows.

$$Vgs3 = Vgb - V2 = 4\,Vdd - 3\,Vdd = Vdd$$

Therefore, the N-type MOSFET for charge transfer 102 which is located in the third stage becomes an on state.

Figure 4:
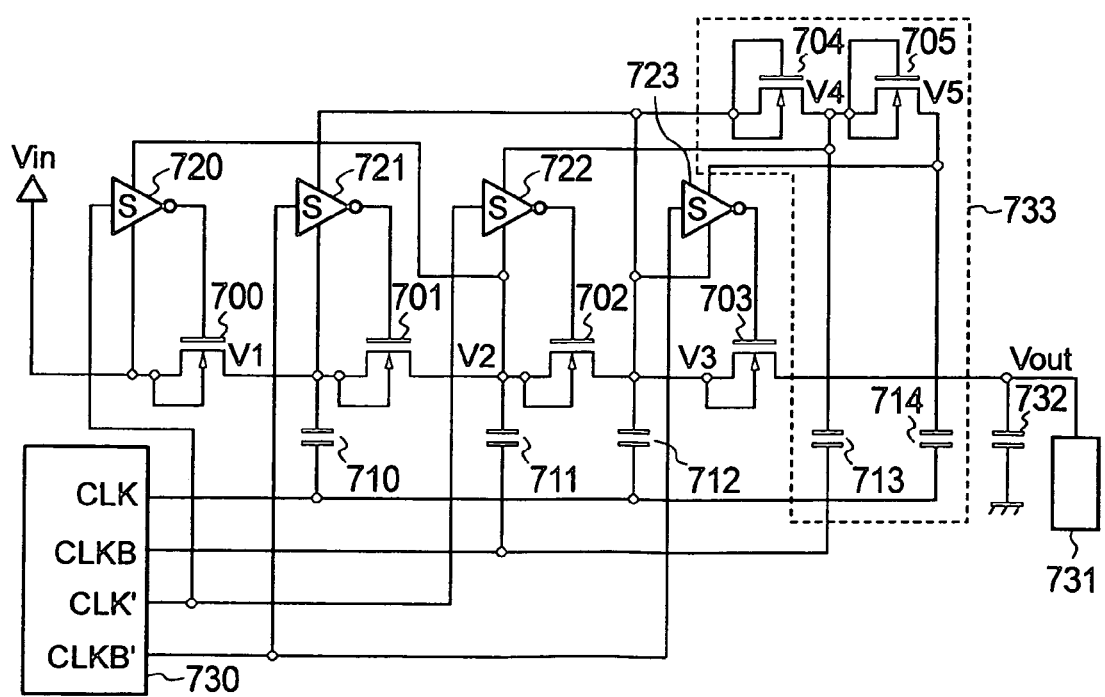
FIG. 4 is a circuit diagram showing a conventional charge pump circuit using charge transfer MOSFETs.

As described above, the charge pump circuit according to the present invention can obtain the same boosting efficiency as that of the conventional charge pump circuit shown in FIG. 4 without using the level shifting circuit and the branch charge pump circuit for supplying the power source voltage to the level shifting circuit. In addition, according to the charge pump circuit of the present invention, the gate voltage of the N-type MOSFET for charge transfer which is provided in a stage is generated based on voltages caused in a previous stage and a next stage, so that a time necessary to obtain a stable state of a boosting operation after the power source voltage is applied can be shortened as compared with the case of the conventional charge pump circuit.

Second Embodiment

Figure 1:
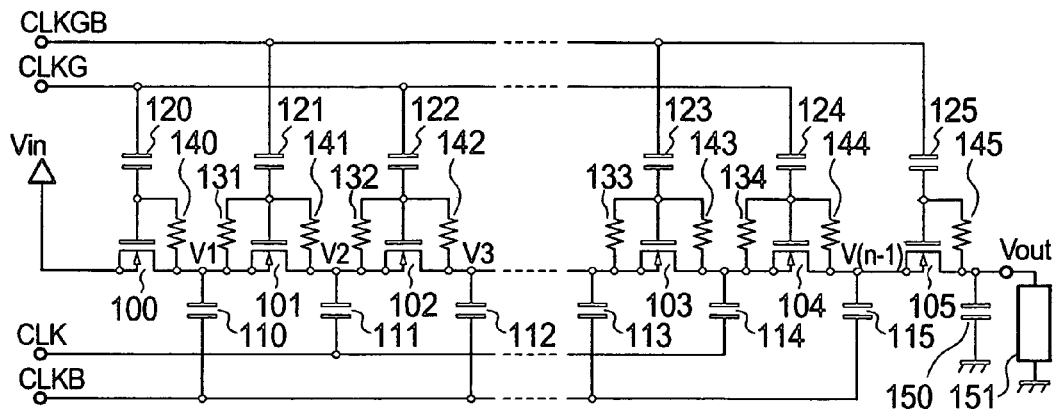
FIG. 1 is a circuit diagram showing a charge pump circuit according to a second embodiment of the present invention.

FIG. 1 is a circuit diagram showing a charge pump circuit according to a second embodiment of the present invention. This is a charge pump circuit having an optimum structure in which voltages are applied to the gates of the N-type MOSFETs for charge transfer 100 and 105 which are the boosting unit located in the first stage and the boosting unit located in the final stage in the charge pump circuit according to the first embodiment of the present invention.

A voltage applied to the gate of the N-type MOSFET for charge transfer 100 which is the boosting unit located in the first stage is generated based only on a voltage caused in a subsequent stage. A voltage applied to the gate of the N-type MOSFET for charge transfer 105 which is the boosting unit located in the final stage is generated based on a voltage of an output terminal.

It is assumed that a power source voltage Vdd is supplied as the input voltage Vin for the first stage, a peak value of the first clock pulse is Vdd, and a peak value of the second clock pule is 2 Vdd. When the above-mentioned structure is used, the boosting unit located in the first stage and the boosting unit located in the final stage operate as described below.

First, an operation of the boosting unit located in the first stage will be described. When the first clock pulse CLK is the H-level, charges are stored in the first coupling capacitor 110, so that V1 becomes Vdd. On the other hand, when the first clock pulse CLK is the L-level, V1 becomes 2 Vdd by the pumping operation of the first coupling capacitor 110. When the pumping operation of the second coupling capacitor is omitted, a gate voltage Vg1 of the N-type MOSFET for charge transfer 100 becomes 1.5 Vdd which is an average level between Vdd and 2 Vdd by the CR effect caused by the second resistor 140 and the second coupling capacitor 120. Therefore, the gate voltage Vg1 is changed with respect to 1.5 Vdd by the pumping operation of the second clock pulse CLKG supplied to the second end of the second coupling capacitor.

In other words, when the first clock pulse CLK is the L-level, a gate-source voltage Vgs1 of the N-type MOSFET for charge transfer 100 which is located in a first stage is obtained as follows.

$$Vgs1 = Vg1 - Vdd = 0.5\,Vdd - Vdd = -0.5\,Vdd$$

Therefore, the N-type MOSFET for charge transfer 100 which is located in the first stage becomes an off state. On the other hand, when the first clock pulse CLK is an H-level, the gate-source voltage Vgs1 of the N-type MOSFET for charge transfer 100 which is located in the first stage is obtained as follows.

$$Vgs1 = Vg1 - Vdd = 2.5\,Vdd - Vdd = 1.5\,Vdd$$

Therefore, the N-type MOSFET for charge transfer 100 which is located in the first stage becomes an on state.

In this case, a gate-source voltage Vgs1 of the N-type MOSFET for charge transfer 100 which is located in the first stage becomes 1.5 Vdd at the time when it is in an on state. Therefore, a voltage applied to the gate becomes higher than that in each of the boosting units located in other stages. Thus, the N-type MOSFET for charge transfer 100 which is located in the first stage can be designed with a size smaller than that of each of the N-type MOSFETs for charge transfer which are located in the other stages.

Next, an operation of the boosting unit located in the final stage will be described. In the boosting unit located in the final stage, a voltage of the drain of the N-type MOSFET for charge transfer 105 is an output terminal voltage Vout and continuously becomes a constant voltage of "n"×Vdd. That is, when the pumping operation of the second coupling capacitor 125 is omitted, a gate voltage Vgn of the N-type MOSFET for charge transfer 105 becomes "n"×Vdd. The gate voltage Vgn is changed with respect to "n"×Vdd by the pumping operation of the second clock pulse CLKGB.

In other words, when the second clock pulse CLKGB is an L-level, the gate voltage Vgn becomes (n−1)×Vdd. When the second clock pulse CLKGB is the H-level, the gate voltage Vgn becomes (n+1)×Vdd.

Therefore, when the first clock pulse CLK is the L-level, a gate-source voltage Vgsn of the N-type MOSFET for charge transfer 105 which is located in the final stage is obtained as follows.

$$Vgsn = Vgn - V(n-1) = (n+1) \times Vdd - n \times Vdd = Vdd$$

Therefore, the N-type MOSFET for charge transfer 105 becomes an on state.

Further, when the first clock pulse CLK is the H-level, a gate-source voltage Vgsn of the N-type MOSFET for charge transfer 105 which is located in the final stage is obtained as follows.

$$Vgsn=Vgn-V(n-1)=(n-1)\times Vdd-(n-1)\times Vdd=0\text{ V}$$

Therefore, the N-type MOSFET for charge transfer 105 becomes an off state.

As described above, the resistor which is provided in the boosting units located in the first stage and the resistor which is provided in the boosting unit located in the final stage are removed from the charge pump circuit according to the first embodiment. Therefore, a size of the charge pump circuit can be further reduced.

What is claimed is:

1. A charge pump circuit, comprising a plurality of boosting circuit units connected in series,
   the boosting circuit units comprising a first stage unit which comprises:
     a charge transfer MOSFET of the first stage;
     a second resistor connected between a drain and a gate of the charge transfer MOSFET of the first stage; and
     a second capacitor connected with the gate of the charge transfer MOSFET of the first stage, and
   the boosting circuit units further comprising a last stage unit which comprises:
     a charge transfer MOSFET of the last stage;
     a first capacitor connected to a source of the charge transfer MOSFET of the last stage;
     a second resistor connected between a drain and a gate of the charge transfer MOSFET of the last stage; and
     a second capacitor connected to the gate of the charge transfer MOSFET of the last stage, and
   the boosting circuit units further comprising at least one intermediate stage unit which each comprises:
     a charge transfer MOSFET of the intermediate stage;
     a first capacitor connected with a source of the charge transfer MOSFET of the intermediate stage;
     a first resistor connected between a source and a gate of the charge transfer MOSFET of the intermediate stage;
     a second resistor connected between the drain and the gate of the charge transfer MOSFET of the intermediate stage; and
     a second capacitor connected with the gate of the charge transfer MOSFET of the intermediate stage,
   wherein a pair of first clock pulses whose phases are reversed to each other are supplied to the first capacitors of adjacent two units of the boosting circuit units, and
   wherein a pair of second clock pulses whose phases are reversed to each other are supplied to the second capacitors of adjacent two units of the boosting circuit units to thereby increase an input voltage.

2. A charge pump circuit according to claim 1, wherein the first stage unit comprises
   a first resistor connected between the source and the gate of the charge transfer MOSFET of the first stage.

3. A charge pump circuit according to claim 1, wherein the last stage unit comprises
   a first resistor connected between the source and the gate of the charge transfer MOSFET of the last stage.

4. A charge pump circuit according to claim 1, wherein the first clock pulses and the second clock pulses which are supplied to the adjacent two units of the boosting circuit units are clock pulses whose phases are reversed to each other and which do not cause a simultaneous ON state.

* * * * *